United States Patent
Akahori

(10) Patent No.: US 7,362,695 B2
(45) Date of Patent: Apr. 22, 2008

(54) OFDM TRANSMISSION SYSTEM

(75) Inventor: Hiroji Akahori, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 247 days.

(21) Appl. No.: 11/057,204

(22) Filed: Feb. 15, 2005

(65) Prior Publication Data

US 2006/0007906 A1    Jan. 12, 2006

(30) Foreign Application Priority Data

Jul. 12, 2004    (JP)    ............................. 2004-205048

(51) Int. Cl.
*H04J 11/00*    (2006.01)
(52) U.S. Cl. .................. 370/208; 370/343; 375/148
(58) Field of Classification Search ................ 370/310, 370/312, 334, 436, 332, 343, 345, 329, 208–210, 370/478, 480; 375/136, 144–148, 150, 152, 375/347
See application file for complete search history.

(56) References Cited

U.S. PATENT DOCUMENTS 7,068,628 B2 * 6/2006 Li et al. .................. 370/334

2002/0003774 A1 * 1/2002 Wang et al. ................ 370/208
2002/0191535 A1 * 12/2002 Sugiyama et al. .......... 370/208
2004/0131011 A1 * 7/2004 Sandell et al. ............. 370/210
2005/0128953 A1 * 6/2005 Wallace et al. ............. 370/241

FOREIGN PATENT DOCUMENTS

JP    2004-96186    3/2004

* cited by examiner

*Primary Examiner*—Edward F. Urban
*Assistant Examiner*—Nhah T. Le
(74) *Attorney, Agent, or Firm*—Nixon Peabody LLP; Donald R. Studebaker

(57) ABSTRACT

With the objective of making it possible to accurately estimate a transmission line and accurately demodulate a signal by a receiving device, the present invention provides a transmission system suitable for use between a transmitting device that performs transmission using first and second transmitting antennas, and a receiving device that performs reception using a plurality of receiving antennas, wherein a pilot signal transmitted through the first transmitting antenna is made orthogonal to a pilot signal transmitted through the second transmitting antenna.

5 Claims, 3 Drawing Sheets

(A) example of transmitting signals with two antennas (Part1)

| (X1, X2, X3, X4, X5) | (A, B, C, D, E) |
|---|---|
| (Y1, Y2, Y3, Y4, Y5) | (F, G, H, I, J) |

(B) example of transmitting signals with two antennas (Part2)

| (X1, X2, X3, X4, X5) | (A, B, A, B, A) |
|---|---|
| (Y1, Y2, Y3, Y4, Y5) | (C, D, C, D, C) |

(C) example of transmitting signals with two antennas (Part3)

| (X1, X2, X3, X4, X5) | (A, B, A, B, A) |
|---|---|
| (Y1, Y2, Y3, Y4, Y5) | (B, A, B, A, B) |

(D) example of transmitting signals with three antennas

| (X1, X2, X3, X4, X5) | (A, B, C, A, B) |
|---|---|
| (Y1, Y2, Y3, Y4, Y5) | (B, C, A, B, C) |
| (Z1, Z2, Z3, Z4, Z5) | (C, A, B, C, A) |

Fig. 4

OFDM TRANSMISSION SYSTEM

BACKGROUND OF THE INVENTION

1. Field of the Invention

The present invention relates to an orthogonal frequency division multiplexing (hereinafter abbreviated as "OFDM") signal transmission system, and particularly to a data structure of pilot signals employed in an MIMO (Multiple Input Multiple Output) system using a transmitting device equipped with a plurality of antennas and a receiving device equipped with a plurality of antennas, and an OFDM transmission system using the same.

2. Description of the Related Art

A patent document 1 (Japanese Unexamined Patent Publication No. 2004-96186) discloses a conventional data structure of pilot signals and an OFDM transmission system using the same. In the patent document 1, an intermittent pilot system has been disclosed in the OFDM signal transmission system. Here, the pilot signals are used to know or recognize transfer functions from antennas on the transmitting side to antennas on the receiving side.

According to the patent document 1, the intermittent pilot system aims to handle pilot signals of a radio wave 2 as null signals without transmitting the pilot signals thereof when a radio wave 1 sends pilot signals. That is, the pilot signals transmitted from the respective radio waves are transmitted so as not to overlap on a time base.

Since, however, the conventional data structure of pilot signals and the OFDM transmission system using the same adopt the intermittent pilot system, a receiving device is capable of receiving pilot signals only at the rate of once per several times. When the peripheral environments of a transmitting device and the receiving device remain absolutely unchanged, it is profitable for the system because the estimation of each transmission line remains unchanged even if the pilot signals are received at the rate of once per several times. However, there may be cases in which after reception of the pilot signals, one of the devices moves or such an obstacle as to cause a multipath different from the previous one moves to a transmission line between the transmitting device and the receiving device under actual operating environments. In this case, a problem arises in that the transmission line cannot be accurately estimated under the use of the previously received pilot signals, and the corresponding signal cannot be accurately demodulated by the receiving device.

In the conventional data structure of pilot signals and the OFDM transmission system using the same, when transmission/reception is performed using P antennas, P pilot signals cannot be obtained so long as transmit data is not received P times. Thus, a problem arises in that it takes time to estimate the transmission line at the early stage of communication.

The conventional data structure of pilot signals and the OFDM transmission system using the same are not configured on the assumption that since the pilot signals are originally set so as not to overlap each other on the time base, they might overlap each other on the time base depending on changes in operating environment. Therefore, a problem arises in that when the pilot signals overlap each other on the time base depending on the changes in operating environment, a desired pilot signal cannot be extracted.

When the conventional data structure of pilot signals and the OFDM transmission system using the same are simply configured so as to always send the pilot signals, a desired pilot signal cannot be extracted due to interference between the mutual pilot signals.

SUMMARY OF THE INVENTION

With the foregoing problems in view, it is an object of the present invention to make it possible to accurately estimate a transmission line and accurately demodulate a signal by a receiving device.

According to one aspect of the present invention, for achieving the above object, there is provided a transmission system suitable for use between a transmitting device that performs transmission using first and second transmitting antennas, and a receiving device that performs reception using a plurality of receiving antennas, wherein a pilot signal transmitted through the first transmitting antenna is made orthogonal to a pilot signal transmitted through the second transmitting antenna.

According to the pilot signals employed in the present invention and the OFDM transmission system using the same, a transmission line can be accurately estimated and a corresponding signal can be accurately demodulated by a receiving device.

The above and further objects and novel features of the invention will more fully appear from the following detailed description appended claims and the accompanying drawings.

BRIEF DESCRIPTION OF THE DRAWINGS

FIG. 4 is a table showing combinations of respective pilot signals placed in an orthogonal relationship.

DETAILED DESCRIPTION OF THE PREFERRED EMBODIMENTS

Figure 1:
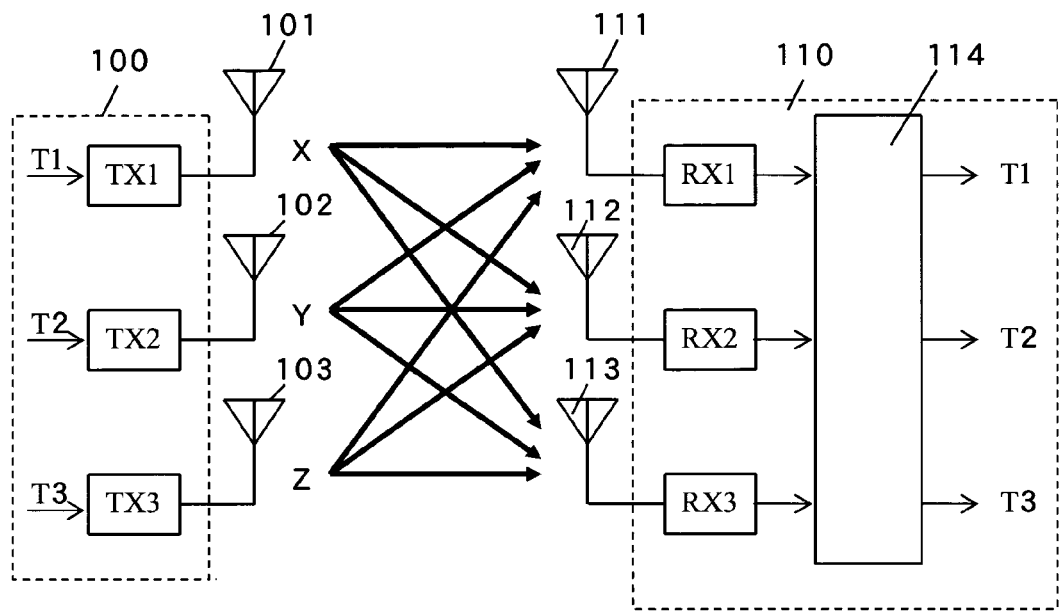
FIG. 1 is a block diagram showing a configuration of an MIMO system using pilot signals, according to the present invention.

Preferred embodiments of the present invention will hereinafter be described in detail with reference to the accompanying drawings.

A description will first be made of an MIMO system using pilot signals, according to the present invention. The MIMO system comprises a transmitting device 100 equipped with two or more antennas and a receiving device 110 equipped with two or more antennas. In this case, the transmitting device 100 comprises three antennas 101 through 103 and transmitters TX1 through TX3. On the other hand, the receiving device 110 comprises three antennas 111 through 113, receivers RX1 through RX3 and an MIMO computing processor 114.

Transmit data T1 is OFDM-modulated by the transmitter TX1, which in turn is transmitted via the antenna 101 as a transmit signal X. Here, the OFDM modulation means that transmit data is subcarrier-modulated and the subcarrier-modulated data is subjected to inverse Fourier transformation, and the inversely Fourier-transformed data is added with a guard interval (GI), followed by being subjected to quadrature modulation thereof. Similarly, transmit data T2 is OFDM-modulated by the transmitter TX2, which in turn is transmitted via the antenna 102 as a transmit signal Y. Transmit data T3 is OFDM-modulated by the transmitter TX3, which in turn is transmitted via the antenna 103 as a transmit signal Z. Let's now assume that multipaths for one antenna of the transmitting device 100 and one antenna of the receiving device 110 are respectively provided three for convenience of explanation. In this case, the antenna 111 of the receiving device 110 is inputted with the transmit signal X as a receive signal X, the transmit signal Y as a receive signal Y1 and the transmit signal Z as a receive signal Z1. The antenna 111 receives the receive signals X1, Y1 and Z1 so that they overlap on a time base. Similarly, the antenna 112 is inputted with the transmit signal X as a receive signal X2, the transmit signal Y as a receive signal Y2 and the transmit signal Z as a receive signal Z2. The antenna 112 receives the receive signals X2, Y2 and Z2 so that they overlap one another on a time base. The antenna 113 is inputted with the transmit signal X as a receive signal X3, the transmit signal Y as a receive signal Y3 and the transmit signal Z as a receive signal Z3. The antenna 113 receives the receive signals X3, Y3 and Z3 so that they overlap on a time base.

The receivers RX1 through RX3 connected to their corresponding antennas frequency-modulate their received signals, remove guard intervals GI therefrom and Fourier-transform the data from which the guard intervals GI have been removed, thereby separating them every subcarriers. The MIMO computing processor 114 connected to the receivers RX1 through RX3 measures amplitudes and phases set every subcarriers, using pilot signals to thereby demodulate the received signals.

First Preferred Embodiment

Figure 2:
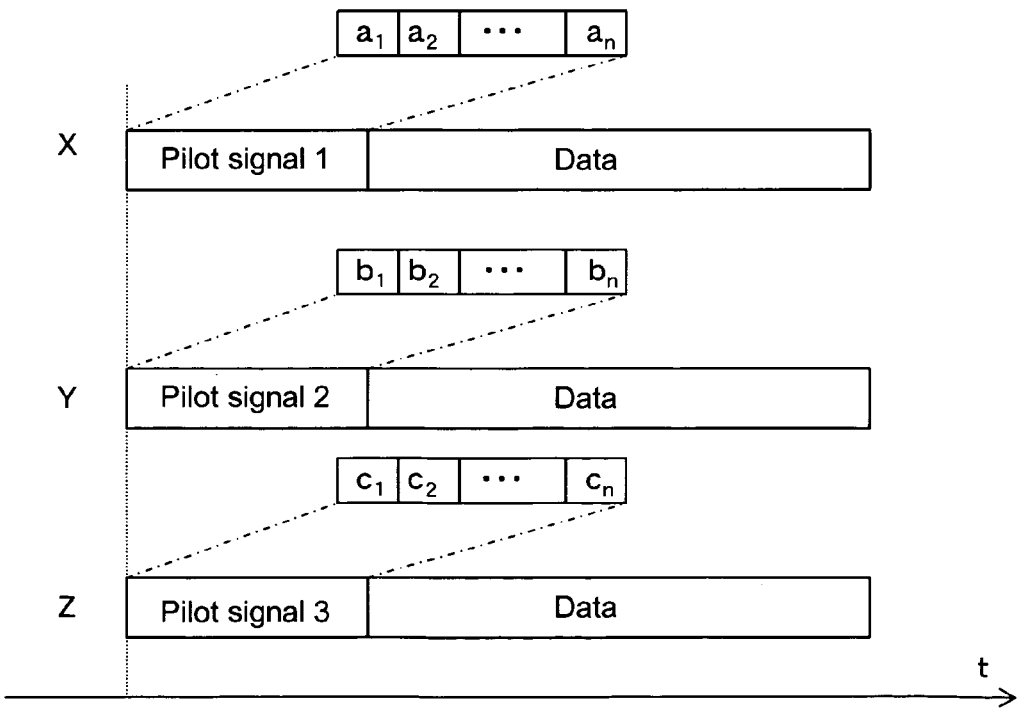
FIG. 2 is a timing chart showing an example illustrative of transmit OFDM signals containing pilot signals employed in the present invention.

FIG. 2 shows a data structure of transmit signals sent from the respective antennas 101 through 103 shown in FIG. 1. Each of the transmit signals comprises a pilot signal and a data main body located behind the pilot signal. For convenience of explanation, only the pilot signals and the data main bodies are disclosed in the present embodiment. As shown in FIG. 2, the respective transmit signals are transmitted so as to overlap one another on a time base.

Figure 3:
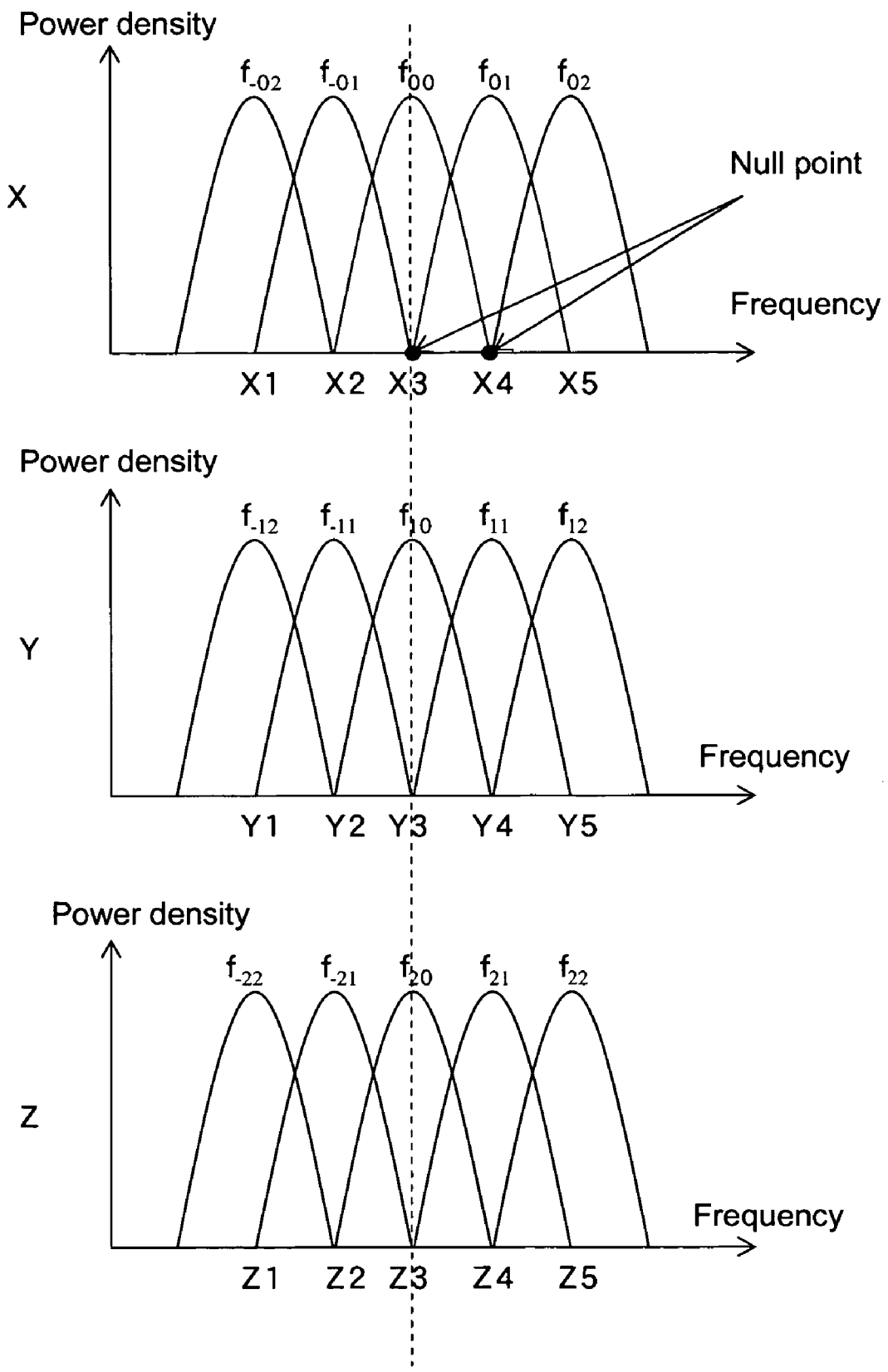
FIG. 3 is a graph depicting a relationship between power densities and frequencies of transmit signals.

FIG. 3 shows transmit signals for describing the relationships among power densities thereof and frequencies thereof. In FIG. 3, $f_{ij}$ (where i and j are arbitrary integers) indicate subcarriers. The adjacent subcarriers are set so as not to interfere with one another. In FIG. 3 as well, Xi, Yi and Zi (where i are arbitrary integers) respectively indicate data strings of pilot signals of respective subcarriers. For example, $Xi=(x1, x2, \ldots, xn)$ (where n: positive integer).

The feature of the present invention resides in that pilot signals of subcarriers, which overlap one another on the time base, and pilot signals of subcarriers adjacent to the subcarriers are orthogonal. This will be explained using FIG. 3. A pilot signal X3 of a subcarrier $f_{00}$ of a transmit signal X is orthogonal to a pilot signal Y3 of a subcarrier $f_{10}$ of a transmit signal Y and a pilot signal Z3 of a subcarrier $f_{20}$ of a transmit signal Z. Further, the pilot signal X3 of the subcarrier $f_{00}$ of the transmit signal X is orthogonal to a pilot signal X2 of a subcarrier $f_{-01}$ and a pilot signal X4 of a subcarrier $f_{01}$ both adjacent to the subcarrier $f_{00}$ of the transmit signal X.

An orthogonal relationship will be specifically explained below using FIG. 2.

Modulation signals of kth data subcarriers contained in OFDM symbols $a_m$ are assumed to be $a_{k,m}$. Here, each OFDM symbol indicates a per-OFDMed symbol based on modulation signals of respective subcarriers. When the modulation of each subcarrier is of Binary Phase Shift Keying (BPSK) here, assume that $a_{k,m}=1, -1$. When the modulation of each subcarrier is of Quadrature Phase Shift Keying (QPSK), assume that $a_{k,m}=a_{k,m,Re}+J^*a_{k,m,Im}$, and $a_{k,m,Re}=1, -1$ and $a_{k,m,Im}=1, -1$. Here, continuous n pilot signals of kth data subcarriers are assumed to be $A_k=[a_{k,1}, a_{k,2}, \ldots, a_{k,4n}]$. Similarly, continuous n pilot signals of kth data subcarriers contained in OFDM symbols $b_m$ are assumed to be $B_k=[b_{k,1}, b_{k,2}, \ldots, b_{k,4n}]$. Continuous n pilot signals of kth data subcarriers contained in OFDM symbols $c_m$ are assumed to be $C_k=[c_{k,1}, c_{k,2}, \ldots, c_{k,4n}]$. In the present invention, pilot signals based on the following regularity are outputted.

(1) n indicates a positive integer and OFDM symbols equal to multiples of 4 are continuously outputted as pilot signals.

(2) The number of $a_{k,m,Re}$ and $a_{k,m,Im}$ ($a_{k,m}$ in the case of BPSK) brought to 1, and the number of $a_{k,m,Re}$ and $a_{k,m,Im}$ ($a_{k,m}$ in the case of BPSK) brought to $-1$ are equal. Similarly, the number of $b_{k,m,Re}$ and $b_{k,m,Im}$ ($b_{k,m}$ in the case of BPSK) brought to 1, and the number of $b_{k,m,Re}$ and $b_{k,m,Im}$ ($b_{k,m}$ in the case of BPSK) brought to $-1$ are equal. Also the number of $c_{k,m,Re}$ and $c_{k,m,Im}$ ($c_{k,m}$ in the case of BPSK) brought to 1, and the number of $c_{k,m,Re}$ and $c_{k,m,Im}$ ($c_{k,m}$ in the case of BPSK) brought to $-1$ are equal.

(3) As shown in FIG. 2, time positions necessary to send out pilot signals contained in respective transmission frames are made identical to one another.

(4) Signal strings of respective transmission frames sent out at the same time are orthogonal code strings or sequences and meet the following relationship.

$$A_k{}^*B_k{}^T=0, \ B_k{}^*C_k{}^T=0, \ C_k{}^*A_k{}^T=0,$$

$$A_k{}^*B_{k-1}{}^T=0, \ A_k{}^*B_{k+1}{}^T=0, \ B_k{}^*C_{k+1}{}^T=0, \ C_k{}^*A_{k-1}{}^T=0,$$
$$C_k{}^*A_{k+1}{}^T=0$$

(where AND indicates an AND transposed matrix).

Owing to the above configuration, the invention of the present application has the following advantageous effects.

Correlation values of a plurality of pilot signals are obtained or taken based on respective subcarriers to thereby make it possible to cause a diffusion effect of noise components and acquire higher accuracy correction information having reduced the noise components.

Owing to the continuous transmission of pilot signals, it is possible to obtain correction information having lightened the influence of a variation in reception level and a variation in phase due to fading rather than to obtain correction components from the same number of non-continuous pilot signals.

A correlation is acquired based on signal strings in which the number of modulation information equal in absolute value and different in polarity is the same. Consequentially, even if symbol-to-symbol interference would occur due to the influence of a multipath exceeding a guard interval, symbol-to-symbol interference components are canceled out one another in the process of correlation acquisition, so that correction information having lightened the influence of the symbol-to-symbol interference can be obtained.

Even if the frequencies used for frequency variables in the receiving device and the frequency of a received OFDM signal are different and interference between subcarriers occurs, correction information having lightened the influence of the interference between the subcarriers can be obtained by performing correlation computations based on pilot signals of adjacent subcarriers and signal information previously provided based on subcarriers on the receiving side.

Also correction information having lightened the influence of interference by other transmission frames can be obtained by performing correlation computations based on pilot signals of subcarriers corresponding to pilot signals of other transmission frames received at the same time on a time base, and pilot signals previously provided based on respective subcarriers on the receiving side.

When errors occur in transmission frequencies of respective transmitting devices, the transmission frequencies of those transmitting devices must be simultaneously processed on the receiving side. Therefore, the degree of subcarrier-to-subcarrier interference produced due to the errors varies depending on transmission frames. However, even if such circumstances that the subcarrier-to-subcarrier interference would occur, are reached, correction information having lightened the influence of subcarrier-to-subcarrier interference between different transmission frames can be obtained by correlation computations based on pilot signals of adjacent subcarriers between the different transmission frames and pilot signals previously provided based on respective subcarriers on the receiving side.

The effect of the invention of the present application will now be explained using the mathematical expressions for estimating the transmission lines and the characteristics of interference, both used in the patent document 1. Let's assume that a pilot signal transmitted from the antenna 101 is $P_1$, a pilot signal transmitted from the antenna 102 is $P_2$, a signal received by the antenna 101 is $R_1$, a signal received by the antenna 112 is $R_2$, the characteristic of a transmission line from the antenna 101 to the antenna 111 is $W_{11}$, the characteristic of a transmission line from the antenna 102 to the antenna 111 is $W_{12}$, the characteristic of a transmission line from the antenna 101 to the antenna 112 is $W_{21}$, and the characteristic of a transmission line from the antenna 102 to the antenna 112 is $W_{22}$. By doing so, the expressions for estimating the transmission lines and the characteristics of interference are represented as follows:

$$\begin{pmatrix} R1 \\ R2 \end{pmatrix} = \begin{pmatrix} W11 & W12 \\ W21 & W22 \end{pmatrix}\begin{pmatrix} P1 \\ P2 \end{pmatrix} = \begin{pmatrix} W11*P1 + W12*P2 \\ W21*P1 + W22*P2 \end{pmatrix}\begin{pmatrix} W11 & W12 \\ W21 & W22 \end{pmatrix} =$$

$$\begin{pmatrix} R1 \\ R2 \end{pmatrix}\begin{pmatrix} \frac{P1^T}{n} & \frac{P2^T}{n} \end{pmatrix} = \begin{pmatrix} W11*P1 + W12*P2 \\ W21*P1 + W22*P2 \end{pmatrix}\begin{pmatrix} \frac{P1^T}{n} & \frac{P2^T}{n} \end{pmatrix}$$

(1)

where $P1*P1^T=n$, $P2*P1^T=0$, $P1*P2^T=0$ and $P2*P2^T=n$

That is, in the data structure of pilot signals, according to the present invention and the transmission system using the same, P pilot signals can be obtained by one transmission even when transmission/reception is performed using P antennas. Thus, the time required to estimate each of the transmission lines can be shortened at the early stage of communication.

Second Preferred Embodiment

Combinations of respective pilot signals of transmit signals transmitted from respective antennas, whose pilot signals are placed in an orthogonal relationship, will next be explained using FIG. 4.

A description will first be made of a case in which a transmitting device and a receiving device respectively make use of two antennas. In this case, let's assume that in FIG. 1, the transmitting device 100 carries out communications using the antennas 101 and 102 and the receiving device 110 performs communications using the antennas 111 and 112. As shown in FIG. 4(A), respective pilot signals of subcarriers of a transmit signal X meet a relationship of (X1, X2, X3, X4, X5)=(A, B, C, D, E). Here, A through E indicate orthogonal code strings or sequences different from one another. On the other hand, respective pilot signals of subcarriers of a transmit signal Y satisfies a relationship of (Y1, Y2, Y3, Y4, Y5)=(F, G, H, I, J). Here, F through J indicate orthogonal code sequences different from one another and also different from A through E. Owing to such a configuration that all orthogonal codes are perfectly different in this way, the respective pilot signals of the respective subcarriers of the two transmit signals do not interfere with one another even if the two transmit signals are significantly shifted in phase according to operating environments. It is therefore possible to carry out satisfactory communications. Incidentally, it is needless to say that the form that the pilot signals of the subcarriers are made up of the orthogonal codes all different from one another as described above, may be applied to a case in which the number of antennas is two or more.

Another example in which the transmitting device and the receiving device make use of the two antennas respectively, will next be explained. As shown in FIG. 4(B), respective pilot signals of subcarriers of a transmit signal X meet a relationship of (X1, X2, X3, X4, X5)=(A, B, A, B, A). Here, A and B are orthogonal code sequences different from each other. On the other hand, respective pilot signals of subcarriers of a transmit signal Y satisfies a relationship of (Y1, Y2, Y3, Y4, Y5)=(C, D, C, D, C). Here, C and D are orthogonal code sequences different from each other and are also different from A and B. That is, the orthogonal code sequences employed in the transmit signal X and the transmit signal Y are respectively provided two by two. Since the number of the orthogonal code sequences employed in one transmit signal is set to two in this way, the finite orthogonal code sequences can be effectively utilized. In this case, such a configuration may preferably be applied where it is known that the phases of the two transmit signals are not much shifted from each other.

A further example in which the transmitting device and the receiving device use the two antennas respectively, will next be described. As shown in FIG. 4(C), respective pilot signals of subcarriers of a transmit signal X satisfies a relationship of (X, X2, X3, X4, X5)=(A, B, A, B, A). Here, A and B are respectively orthogonal code sequences different from each other. On the other hand, respective pilot signals of subcarriers of a transmit signal Y meets a relationship of (Y1, Y2, Y3, Y4, Y5)=(B, A, B, A, B). That is, the orthogonal codes employed in the transmit signal X and the transmit signal Y are identical but different in arrangement. With such a configuration that the same orthogonal codes are used and only their arrangements are made different in this way, the finite orthogonal codes can be effectively utilized. Also a circuit for generating orthogonal code sequences may be covered with one and hence the whole device can be scaled down. Further, power consumption can also be saved with a decrease in the number of circuits. Owing to such a configuration that the same orthogonal codes are used and only their arrangements are made different in this case, this configuration may preferably be applied where it is known that the phases of the two transmit signals are not much shifted from each other.

A description will next be made of a case in which the transmitting device and the receiving device make use of three antennas respectively. In this case, let's assume that in FIG. 1, the transmitting device 100 carries out communications using the antennas 101 through 103 and the receiving device 110 performs communications using the antennas 111 through 113. Incidentally, this case corresponds to a modification of the method shown in FIG. 4(C). As shown in FIG. 4(D), respective pilot signals of subcarriers of a transmit signal X meet a relationship of (X1, X2, X3, X4, X5)=(A, B, C, A, B). Here, A through C indicate orthogonal code strings or sequences different from one another. On the other hand, respective pilot signals of subcarriers of a transmit signal Y satisfies a relationship of (Y1, Y2, Y3, Y4, Y5)=(B, C, A, B, C). Respective pilot signals of subcarriers of a transmit signal Z satisfies a relationship of (Z1, Z2, Z3, Z4, Z5)=(C, A, B, C, A). That is, orthogonal codes employed in the transmit signals X through Z are identical but different in their arrangements. With such a configuration that the same orthogonal codes are used and only their arrangements are made different in this way, the finite orthogonal codes can be effectively utilized. Also a circuit for generating orthogonal code sequences may be covered with one and hence the whole device can be reduced. Further, power consumption can also be saved with a decrease in the number of circuits. Owing to such a configuration that the same orthogonal codes are used and only their arrangements are made different in this case, this configuration may preferably be applied where it is known that the phases of the three transmit signals are not much shifted from one another. It is needless to say that such a configuration that as described above, the pilot signals of the subcarriers make use of the same orthogonal codes and are made different in their arrangements alone, may be applied to a case in which the number of antennas is four or more.

While the preferred forms of the present invention have been described, it is to be understood that modifications will be apparent to those skilled in the art without departing from the spirit of the invention. The scope of the invention is to be determined solely by the following claims.

This application is based upon and claims the benefit of priority from prior Japanese Patent Application No. 2004-205048, filed on Jul. 12, 2004 in Japan, the entire contents of which are incorporated herein by reference.

What is claimed is:

1. An OFDM transmission system suitable for use between a transmitting device and a receiving device, comprising:
a transmitting device that performs transmission using first and second transmitting antennas; and
a receiving device that performs reception using a plurality of receiving antennas,
wherein a first pilot signal transmitted through the first transmitting antenna is orthogonal to a second pilot signal transmitted through the second transmitting antenna; and
the first pilot signals are transmitted for every subcarrier, the first pilot signal transmitted in a first subcarrier is identical to the first pilot signal transmitted in a third subcarrier non-adjacent to the first subcarrier, and orthogonal to the first pilot signal transmitted in a second subcarrier adjacent to the first and third subcarriers.

2. The OFDM transmission system according to claim 1, wherein the second pilot signals are transmitted every subcarriers, and the second pilot signal transmitted in a fourth subcarrier is identical to the second pilot signal transmitted in a sixth subcarrier non-adjacent to the fourth subcarrier, and orthogonal to the second pilot signal transmitted in a fifth subcarrier adjacent to the fourth and sixth subcarriers, and
wherein the second pilot signals transmitted in the fourth through sixth subcarriers are respectively orthogonal to the first pilot signals transmitted in the first through third subcarriers.

3. The OFDM transmission system according to claim 1, wherein the second pilot signals are transmitted every subcarriers, and the second pilot signal transmitted in a fourth subcarrier is identical to the second pilot signal transmitted in a sixth subcarrier non-adjacent to the fourth subcarrier, and orthogonal to the second pilot signal transmitted in a fifth subcarrier adjacent to the fourth and sixth subcarriers, and
wherein the second pilot signals transmitted in the fourth and sixth subcarriers are identical to the first pilot signals transmitted in the first and third subcarriers, and the second pilot signal transmitted in the fifth subcarrier is identical to the first pilot signal transmitted in the second subcarrier.

4. An OFDM transmission system suitable for use between a transmitting device and a receiving device, comprising:
a transmitting device which performs transmission using first, second and third transmitting antennas; and
a receiving device which performs reception using a plurality of receiving antennas,
wherein a first pilot signal transmitted through the first transmitting antenna is transmitted for every first, second and third subcarriers, and the first through third subcarriers are orthogonal to one another,
wherein a second pilot signal transmitted through the second transmitting antenna is transmitted for every fourth, fifth and sixth subcarriers, and the fourth through sixth subcarriers are orthogonal to one another,
wherein a third pilot signal transmitted through the third transmitting antenna is transmitted for every seventh, eighth and ninth subcarriers, and the seventh through ninth subcarriers are orthogonal to one another,
wherein the first pilot signal transmitted in the first subcarrier is identical to the second pilot signal transmitted in the sixth subcarrier and the third pilot signal transmitted in the eighth subcarrier,
wherein the first pilot signal transmitted in the second subcarrier is identical to the second pilot signal transmitted in the fourth subcarrier and the third pilot signal transmitted in the ninth subcarrier, and
wherein the first pilot signal transmitted in the third subcarrier is identical to the second pilot signal transmitted in the fifth subcarrier and the third pilot signal transmitted in the seventh subcarrier.

5. An OFDM transmission system suitable for use between a transmitting device and a receiving device, comprising:
a transmitting device that performs transmission using n (where n: positive integer) transmitting antennas; and
a receiving device that performs reception using a plurality of receiving antennas,
wherein ith pilot signals transmitted from the i (where i: positive integer that satisfies $i \leq n$) th transmitting antennas are respectively transmitted every n subcarriers and the n subcarriers are orthogonal to one another, wherein i+1th pilot signals transmitted from the i+1th transmitting antennas are respectively transmitted every n subcarriers and the n subcarriers are orthogonal to one another, and wherein the ith pilot signals transmitted in j (where j: positive integer that satisfies j≦n) th subcarriers via the ith transmitting antennas are identical to the i+1th pilot signals transmitted in j−1 (corresponding to an nth when j−1 is 0) th subcarriers via the i+1th transmitting antennas.

* * * * *